Sept. 11, 1923.
W. A. HARRIS
LOW PRESSURE ALARM FOR PNEUMATIC TIRES
1,467,317
Original Filed May 5, 1922   2 Sheets-Sheet 2
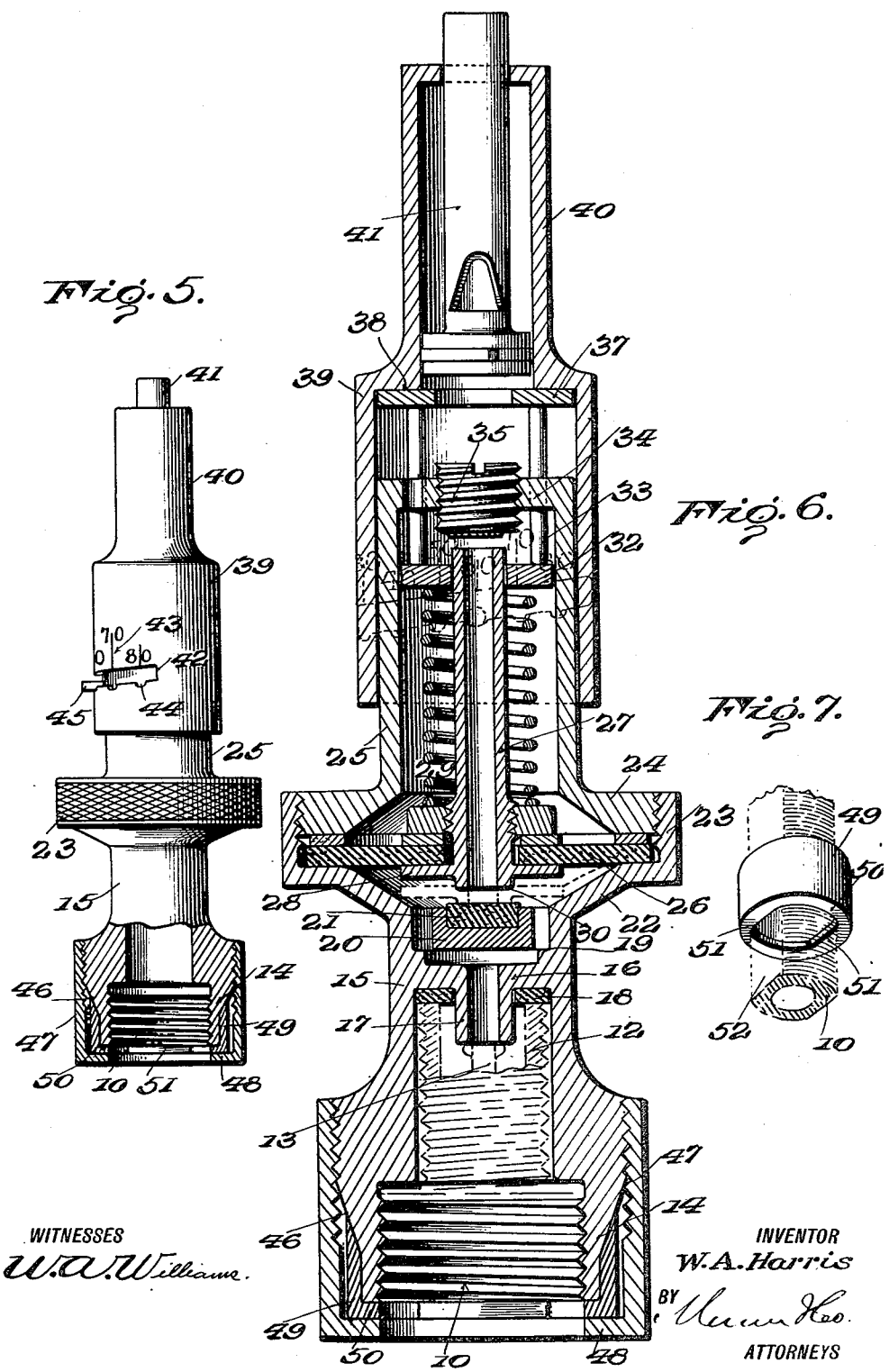

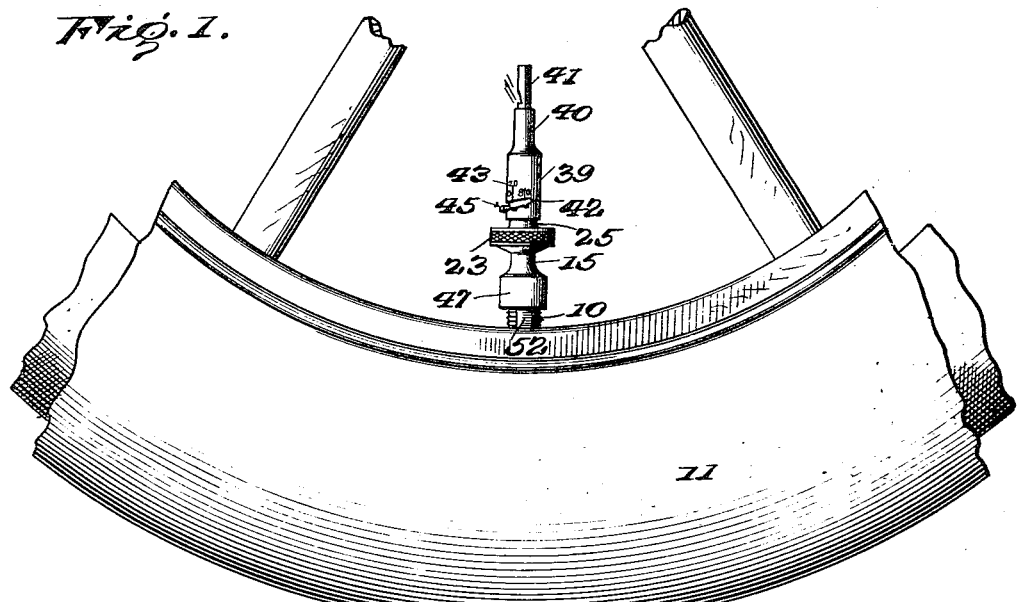
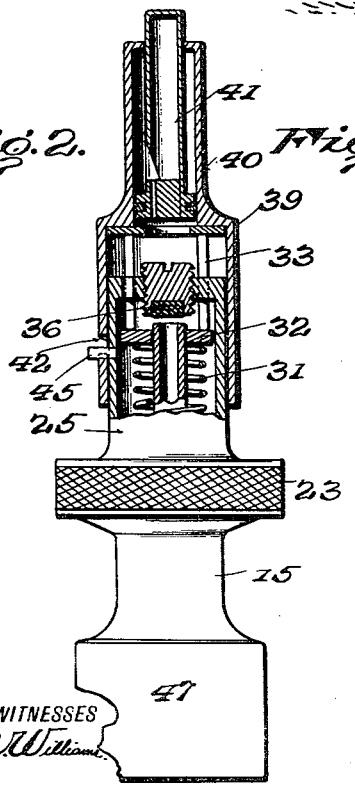
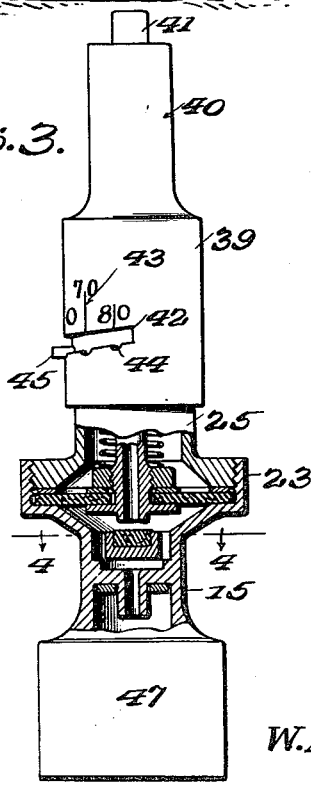
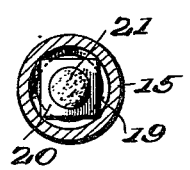

Patented Sept. 11, 1923.

1,467,317

UNITED STATES PATENT OFFICE.

WILLIAM A. HARRIS, OF GREENVILLE, SOUTH CAROLINA, ASSIGNOR TO HARRIS ACCESSORY COMPANY, OF GREENVILLE, SOUTH CAROLINA, A CORPORATION OF SOUTH CAROLINA.

LOW-PRESSURE ALARM FOR PNEUMATIC TIRES.

Application filed May 5, 1922, Serial No. 558,823. Renewed February 20, 1923.

*To all whom it may concern:*

Be it known that I, WILLIAM A. HARRIS, a citizen of the United States, and a resident of Greenville, in the county of Greenville and State of South Carolina, have invented certain new and useful Improvements in Low-Pressure Alarms for Pneumatic Tires, of which the following is a specification.

My present invention relates generally to low pressure alarms for the pneumatic tires of automobiles and other motor cars, and more particularly to certain improvements in that type of alarm device described and claimed in my copending application No. 449,851 which was filed March 5, 1921, my object being to overcome certain difficulties and disadvantages to which the former construction has been found to be subject.

In my application just above referred to, the inner end of an air tube in the form of a lengthwise shiftable hollow stem, was held by a controlling spring in seated relation at its inner end upon a soft rubber disk in opposition to the pressure within the tire when the latter fell below the pressure of the spring, and the full pressure of the spring over any considerable length of time was found to bring about a sticking of the parts which prevented the stem from properly rising as the air pressure was replenished to the desired point. I have prevented this disadvantage in the present construction by limiting the movement of the stem so that it can only seat at its inner end with sufficient pressure to be airtight.

It was also found that the lower portion or holder of the former construction involved an internal structure difficult and somewhat costly to complete, for which my present construction proposes a much less costly though equally efficient substitute.

Another objection to the former construction in respect to too ready removal of the alarm as a whole from a tire valve tube, I have remedied by the provision of means which, while permitting of ready removal in the hands of one understanding the structure, is otherwise difficult of removal and will effectively prevent accidental displacement.

In the former construction it was also required that for the purposes of adjustment for different air pressures, a cap having a portion screwing on the barrel or casing and also engaging spring adjusting connections, be turned more or less, and it was found that the ordinary user could not properly adjust the parts, so that I now propose certain adjustment controlling means which leave nothing to chance and which provide alike for extreme ease of adjustment and accuracy.

In the accompanying drawings, which illustrate my present improvements and form a part of this specification, Figure 1 is a side view of a portion of a wheel and tire illustrating the practical application of my invention, Figure 2 is a detail side view of my improved alarm with the upper portion thereof broken away and in section, Figure 3 is a side view with the intermediate portion broken away and in section.

Figure 4 is a detail horizontal section taken substantially on line 4—4 of Figure 3, Figure 5 is a side view illustrating the extreme lower portion broken away and in section, Figure 6 is an enlarged central vertical sectional view through the entire alarm device, and Figure 7 is a detail perspective view showing the locking ring upon a portion of a tire valve tube.

Referring now to these figures and particularly to Figure 1, I have shown the valve tube 10 of a pneumatic tire 11, the usual upper reduced cap receiving portion 12 of which tube is seen broken away in Figure 6 in order to expose the usual valve stem 13 to view.

In my alarm the valve tube 10 is received within the lower enlarged and internally threaded portion 14 of a holder 15 of cylindrical form provided intermediate its ends with a transverse wall 16 which in accordance with my present improvements is formed with an integral depending tubular extension 17 adapted to engage the valve stem 13 and hold the latter inwardly so that the valve within the tube 10 will be unseated at all times when the holder is screwed on the stem, it being noted that the upper end of the upper reduced portion 12 of the valve tube 10 seats against a gasket 18, which may be of soft metal, supported against the lower surface of the wall 16 around the tubular depending extension 17.

In further accord with my present improvements, the holder 15 is provided with an internal annular shoulder 19 around the upper outer portion of the transverse wall 16, above the latter of which the holder is adapted to receive a square gasket supporting block 20 as particularly seen by a comparison of Figures 3, 4 and 6, supporting centrally of its upper face a soft rubber gasket 21. This gasket supporting block may be pressed downwardly into the upper portion of the holder 15 until its four corners rest upon the internal annular shoulder 19, the fact that the block is square leaving ample spaces at its sides for the passage of air upwardly through the holder.

The upper portion of the holder 15 above the wall 16 and immediately above the gasket supporting block 20 is flared as at 22 and at the upper outer edge of this flared portion 22 is an upstanding annular internally threaded flange 23 within which the lower enlarged externally threaded portion 24 of the barrel or casing 25 screws to clamp the outer edge of a diaphragm 26 between the same and the upper flared portion of the holder 15.

Within the barrel or casing 25 a lengthwise shiftable hollow stem 27 is disposed with its lower end projecting through the central aperture of the diaphragm 26 and clamped with the latter by virtue of a disk 28 around the lower portion of the stem engaging the lower surface of the diaphragm and a nut 29 threaded on the stem to engage the upper surface of the gasket, the stem having a slightly protruding lower extremity 30 below its lower disk 28 to engage the gasket 21 when the stem is shifted inwardly by its controlling spring 31.

By reference to Figure 6 in particular it will be noted that the flared upper portion 22 of the holder is so related to the other parts that the lower outer edge of the lower disk 28 of the stem 27 will engage this flared portion when the lower protruding portion 30 of the stem engages the gasket 21 with sufficient pressure to form an airtight joint and will prevent any further inward movement of the stem under tension of its controlling spring 31 so as to avoid danger of the stem sticking against the gasket 21.

The spring 31 which is coiled around the stem 27 within the barrel or casing 25, with its lower end bearing against the nut 29 as seen in Figure 3, is engaged at its upper end by a pressure ring 32 around the upper portion of the hollow stem, this ring being in turn engaged by the lower ends of pins 33 slidably mounted through openings in the upper end 34 of the barrel or casing 25, in a series around the central top opening of this barrel or casing in which a plug 35 is threaded, this plug supporting at its lower end a gasket 36 which is engaged by the upper end of the stem 27 to close the latter in the normal position of the parts before an alarm is sounded.

Upon the upper ends of the adjusting pins 33 a ring 37 is disposed and engaged by the intermediate downwardly facing internal annular shoulder 38 of the cap 39 whose lower enlarged portion in the present instance telescopes the upper portion of the barrel or casing 25 and whose upper reduced tubular portion 40 normally houses the vertically shiftable alarm member 41 which is moved upwardly in operation to an exposed position by air pressure against its lower end and which also forms a whistle actuated by air pressure when it is shifted upwardly to exposed position.

According to my present improvements the lower enlarged portion of the cap 39 has an arcuate slot 42 inclined regularly from one end to the other and provided along its upper edge with graduations 43 and at its lower edge with recesses 44 opposite the several graduations, the barrel or casing 25 having fixed thereto a pin 45 which projects outwardly through the slot 42 and may be positioned in a selected recess 44 by first pressing the cap 39 inwardly to a slight extent and then partially rotating the same, it being obvious that this partial rotation of the cap will regulate the tension of the spring 31 by controlling the pressure against the upper end of the spring through the rings 32 and 37 and the pins 33. By thus providing for a positive adjusting movement of the cap in accordance with pressure graduations thereon which may be viewed from the outside, I avoid all dependence upon chance adjustment as well as all danger of accidental displacement after adjustment is once made.

It has been hereinbefore explained that the lower enlarged and internally threaded portion 14 of the holder 15 screws upon the upper portion of the tire valve tube 10 as may be clearly seen by reference to Figures 5 and 6. I preferably reduce the outer portion of the extreme lower end of the portion 14 of the holder and provide the same with an inclined annular face 46, most plainly seen in Figures 5 and 6 and I externally thread the lower enlarged portion 14 of the holder above this inclined face 46 to receive the upper internally threaded portion of a locking band 47 whose lower portion has an inturned annular flange 48 adapted to turn freely around the tire valve tube 10. Within this locking band 47 I utilize a wedge ring 49 adapted to extend around the lower end of the enlarged lower portion 14 of the holder 15 and provided with an upper inner inclined surface to coact with the inclined surface 46, this wedge ring having a lower inturned flange 50 to receive the tire valve tube 10, having flat opposing inwardly presented edges 51 to engage the usual flattened sides 52 of the tire valve tube so as to permit the wedge ring to be shifted lengthwise on the valve tube and at the same time prevent its rotation thereon.

Thus by first disposing the locking band 47 with the wedge ring therein around a tire valve tube and then screwing the holder 15 on the tube, the band 47 may be then screwed onto the lower enlarged portion 14 of the holder until the wedge ring 49, which cannot rotate, is forced into binding engagement with the holder by virtue of the cooperating inclined surface of this wedge ring and the holder. Thus with the wedge ring in binding engagement with the holder 15 the alarm as a whole is locked on the tire valve tube inasmuch as the wedge ring 49 cannot rotate, and will remain so locked until the locking band 47 is unscrewed or backed off of the lower enlarged portion of the holder to a sufficient extent to relieve the binding engagement of the wedge ring against the holder.

It is due to this locking means just described as well as to the gasket holding block 20 and its supporting means, the particular coaction of the upper flared portion 22 of the holder and the lower disk 28 of the hollow stem, and also to the positive adjusting means of the cap, that I am able to overcome the objections and disadvantages of my former construction, in an efficient manner and without materially complicating the same or adding to the cost of production.

I claim:

1. In a low pressure alarm of the character described, a casing, spring actuated pressure controlled means in the casing including a hollow stem and a diaphragm through which the inner end of the stem projects, a gasket against which the said inner end of the stem closes in one position, pressure actuated alarm means, and means supporting said gasket and coacting with a portion of the stem to limit the effective seating pressure of the stem against the said gasket.

2. In a low pressure alarm of the character described, a casing, spring actuated pressure controlled means in the casing including a hollow stem and a diaphragm through which the inner end of the stem projects, a gasket against which the said inner end of the stem closes in one position, pressure actuated alarm means, and a holder in which the gasket is disposed and to which the said casing is attached, said stem having a member adjacent to its inner end, engageable with a portion of the holder to limit effective seating pressure of the stem against the gasket.

3. In a low pressure alarm of the character described, a casing, spring actuated pressure controlled means in the casing including a hollow stem and a diaphragm through which the inner end of the stem projects, a gasket against which the said inner end of the stem closes in one position, pressure actuated alarm means, a holder to which the casing is attached, having means to engage a tire valve tube and having an inner transverse wall provided with an axial bored depending extension and with an internal annular shoulder around the upper portion of the said wall, and a rectangular block fixed in the upper portion of the holder and seated on said shoulder, for supporting the said gasket.

4. In a low pressure alarm, a casing having an alarm and alarm controlling and actuating means therein, a holder supporting the casing and having a lower threaded bore to receive the valve tube of a tire, and also having a lower externally threaded portion provided with an inclined surface, a locking band threaded to engage the external threads of the stem, and a wedge ring lengthwise shiftable on and non-rotatably engageable with a valve tube, said wedge ring having an inclined surface and being carried with the locking ring for movement with the latter into binding engagement with the inclined surface of the holder.

5. In a low pressure alarm, a casing, having an alarm and alarm controlling and actuating means therein, a holder supporting the casing, having a lower threaded bore to receive the valve tube of a tire and also having external threads, a locking band adapted to freely move upon a valve tube and threaded to engage the external threads of the holder, and a wedge ring within the locking band, shiftable on and having means to non-rotatably engage a valve tube, said wedge ring and said holder having coacting portions shiftable into binding engagement when the locking band is tightened, for the purpose described.

WILLIAM A. HARRIS.